United States Patent
Kim

(10) Patent No.: US 9,542,623 B2
(45) Date of Patent: Jan. 10, 2017

(54) IMAGE CLASSIFICATION DEVICE, METHOD FOR OPERATING THE SAME AND ELECTRONIC SYSTEM COMPRISING THE IMAGE CLASSIFICATION DEVICE

(71) Applicant: Samsung Electronics Co., Ltd., Suwon-si (KR)

(72) Inventor: Hyo-Eun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/639,488

(22) Filed: Mar. 5, 2015

(65) Prior Publication Data
US 2015/0363430 A1    Dec. 17, 2015

(30) Foreign Application Priority Data
Jun. 11, 2014    (KR) .................. 10-2014-0070899

(51) Int. Cl.
*G06K 9/62*    (2006.01)
*G06F 17/30*   (2006.01)

(52) U.S. Cl.
CPC ......... *G06K 9/6267* (2013.01); *G06F 17/3028* (2013.01); *G06K 9/628* (2013.01); *G06K 9/6284* (2013.01)

(58) Field of Classification Search
CPC ................... G06K 9/6267; G06F 17/3028
See application file for complete search history.

(56) References Cited

U.S. PATENT DOCUMENTS

| 5,633,678 | A  | * | 5/1997 | Parulski ........... G06F 17/30265 348/231.5 |
| 7,035,467 | B2 |   | 4/2006 | Nicponski |
| 8,358,811 | B2 |   | 1/2013 | Adams et al. |
| 8,452,778 | B1 |   | 5/2013 | Song et al. |
| 8,478,052 | B1 | * | 7/2013 | Yee ..................... G06K 9/4676 382/155 |
| 8,503,792 | B2 |   | 8/2013 | Zhang et al. |
| 8,533,134 | B1 |   | 9/2013 | Zhao et al. |
| 8,611,677 | B2 |   | 12/2013 | Das et al. |

(Continued)

FOREIGN PATENT DOCUMENTS

| JP | 2003067722 | 3/2003 |
| JP | 2003281163 | 10/2003 |

(Continued)

*Primary Examiner* — Siamak Harandi
*Assistant Examiner* — Amandeep Saini
(74) *Attorney, Agent, or Firm* — Onello & Mello LLP

(57) ABSTRACT

An image classification device, determines in real time which one of a plurality of directories is a suitable directory for storing newly taken photographs. The plurality of directories may defined by a user. The image classification device may recommend the suitable directory to the user. The image classification device may include a camera module for photographing a target and for generating a target image, a sensor for sensing first environment information concerning the target image, a storage module including N directories for storing the target image, where N is a natural number, and a processor for extracting first content information from the target image and for selecting from among the N directories a suitable directory within which the target image may be stored, based on the first content information and the first environment information.

19 Claims, 15 Drawing Sheets

(56) References Cited

U.S. PATENT DOCUMENTS

2010/0111428 A1* 5/2010 Yu .................... G06F 17/30265
                                                    382/228
2010/0260426 A1   10/2010 Huang et al.

FOREIGN PATENT DOCUMENTS

| JP | 2006086801 | 3/2006 |
| JP | 2007058792 | 3/2007 |
| KR | 0705177 | 4/2007 |
| KR | 2010026724 | 3/2010 |
| KR | 2012064577 | 6/2012 |
| KR | 1203516 | 11/2012 |

* cited by examiner

FIG.4

$$\begin{bmatrix} a\_0,0 & a\_0,1 & a\_0,2 & \cdots & a\_0,N\text{-}1 \\ a\_1,0 & a\_1,1 & a\_1,2 & \cdots & a\_1,N\text{-}1 \\ & & \vdots & & \\ a\_M\text{-}1,0 & a\_M\text{-}1,1 & a\_M\text{-}1,2 & \cdots & a\_M\text{-}1,N\text{-}1 \end{bmatrix} M \times N$$

M N-dimensional classifiers

FIG. 5

$$\begin{bmatrix} X\_0 \\ X\_1 \\ \\ X\_N\text{-}1 \end{bmatrix}$$

FIG. 6

$$\begin{bmatrix} \text{number of faces} \\ \text{major face exist?} \\ \text{light} \\ \text{day or night} \\ \vdots \\ \text{gps info} \end{bmatrix}$$

FIG. 7

$$\begin{bmatrix} \underbrace{\textcircled{1}}\ 0\ \ 0\ \ 0\ \cdots\ 0 \\ 0\ \ 1\ \ 0\ \ 0\ \cdots\ 1 \\ \vdots \\ 0\ \ 0\ \ 0\ \ 1\ \cdots\ 0 \end{bmatrix}_{M \times K} = \begin{bmatrix} \overbrace{a\_0,0\ \ \ \ a\_0,1\ \ \ \ a\_0,2\ \cdots\ a\_0,N\text{-}1} \\ a\_1,0\ \ \ \ a\_1,1\ \ \ \ a\_1,2\ \cdots\ a\_1,N\text{-}1 \\ \vdots \\ a\_M\text{-}1,0\ \ a\_M\text{-}1,1\ \ a\_M\text{-}1,2\ \cdots\ a\_M\text{-}1,N\text{-}1 \end{bmatrix}_{M \times N} \times \begin{bmatrix} X\_0,0\ \ \ X\_0,1\ \ \ X\_0,2\ \cdots\ X\_0,K\text{-}1 \\ X\_1,0\ \ \ X\_1,1\ \ \ X\_1,2\ \cdots\ X\_1,K\text{-}1 \\ \vdots \\ X\_N\text{-}1,0\ \ X\_N\text{-}1,1\ \ X\_N\text{-}1,2\ \cdots\ X\_N\text{-}1,K\text{-}1 \end{bmatrix}_{N \times K}$$

result directory (circled 1): K training results | single domain classifier — M N-dimensional classifiers | single input vector — K training inputs

FIG. 8

$$\begin{bmatrix} 1 \\ 0 \\ 0 \\ 0 \\ 0 \\ 0 \end{bmatrix}_{M \times 1} = \begin{bmatrix} \overbrace{a\_0,0 \quad a\_0,1 \quad a\_0,2 \quad \cdots \quad a\_0,N\text{-}1}^{\text{single domain classifier}} \\ a\_1,0 \quad a\_1,1 \quad a\_1,2 \quad \cdots \quad a\_1,N\text{-}1 \\ \vdots \\ a\_M\text{-}1,0 \quad a\_M\text{-}1,1 \quad a\_M\text{-}1,2 \cdots a\_M\text{-}1,N\text{-}1 \end{bmatrix}_{M \times N} \times \begin{bmatrix} X\_0 \\ X\_1 \\ \vdots \\ X\_N\_1 \end{bmatrix}_{N \times 1}$$

RESULT                       C.MODEL                     V.IMAGE

IMAGE CLASSIFICATION DEVICE, METHOD FOR OPERATING THE SAME AND ELECTRONIC SYSTEM COMPRISING THE IMAGE CLASSIFICATION DEVICE

CROSS-REFERENCE TO RELATED APPLICATION

This application claims priority from Korean Patent Application No. 10-2014-0070899 filed on Jun. 11, 2014 in the Korean Intellectual Property Office, and all the benefits accruing therefrom under 35 U.S.C. 119, the contents of which in its entirety are herein incorporated by reference.

BACKGROUND

1. Field of the Invention

Inventive concepts relate to an image classification device, a method for operating the same and an electronic system comprising the image classification device.

2. Description of the Related Art

A photo album of a smart device can be configured to allow a user to generate arbitrary directories for classifying photographs. For best results a user should classify photographs at the time they are taken, rather than returning to the photographs at a later date and trying to recreate the context of the photograph in an attempt at accurately classifying them. Because users get caught up in the moment, and don't necessarily classify photographs as they are taken, photographs are often left unclassified, with all of them stacked into a basic, non-categorized directory.

SUMMARY

In exemplary embodiments in accordance with principles of inventive concepts an image classification device includes a camera module that photographs a target and generating a target image, a sensor that senses first environment information concerning the target image; a storage module including N directories for storing the target image, where N is a natural number; and a processor that extracts first content information from the target image and selecting from among the N directories a directory in which the target image is to be stored, based on the first content information and the first environment information.

In exemplary embodiments in accordance with principles of inventive concepts first environment information includes information acquired according to extrinsic factors of the target image.

In exemplary embodiments in accordance with principles of inventive concepts first content information includes information acquired from the target image itself.

In exemplary embodiments in accordance with principles of inventive concepts first content information includes information concerning whether to enlarge, reduce, or rotate the target image or not.

In exemplary embodiments in accordance with principles of inventive concepts N directories are defined by a user and the identity of a directory from among the N directories, in which the target image is recommended to be stored is provided to the user.

In exemplary embodiments in accordance with principles of inventive concepts N directories are defined by a user and different representative images are registered in the respective N directories.

In exemplary embodiments in accordance with principles of inventive concepts a processor includes a first sub-processor that converts the different representative images stored in the respective N directories into vector forms; and a second sub-processor that creates a classification model based on the vector-converted representative images and the N directories.

In exemplary embodiments in accordance with principles of inventive concepts the first sub-processor converts the target image into a vector form, including the first content information and the first environment information.

In exemplary embodiments in accordance with principles of inventive concepts the processor further comprises a third sub-processor that selects a directory among the N directories, in which the target image is to be stored using the classification model and the vector-converted target image.

In exemplary embodiments in accordance with principles of inventive concepts the processor creates a classification model for selecting a directory from among the N directories, in which the target image is to be stored, and the classification model is used in calculating suitability indexes of the N directories to the target image.

In exemplary embodiments in accordance with principles of inventive concepts the processor directly receives the target image from the camera module.

In exemplary embodiments in accordance with principles of inventive concepts an electronic system includes an interfacer for receiving inputs from a user to register representative images in respective N directories, where N is a natural number, under which images are stored; a camera for receiving a first command from the interfacer, that photographs a target based on the first command and for generating a target image; a processor that receives a second command different from the first command from the interfacer, that creates a classification model, and that selects from among the N directories a directory in which the target image is recommended to be stored, using the classification model; and an output unit that processes information concerning the selected directory and for providing the processed information to the interfacer, wherein the interfacer is configured to display the information concerning the selected directory received from the output unit.

In exemplary embodiments in accordance with principles of inventive concepts the interface includes a display panel for enabling a touch input.

In exemplary embodiments in accordance with principles of inventive concepts the first command includes a command to photograph the target.

In exemplary embodiments in accordance with principles of inventive concepts the second command includes a command to create the classification model based on the N directories and the representative images registered in the respective N directories.

In exemplary embodiments in accordance with principles of inventive concepts a camera includes an imager that captures a target image; a processor configured to store captured images in different directories; the processor also configured to extract content information and environment information related to a captured target image; the processor also configured to determine from the content and environment information which of the different directories is most suitable for the captured image; and the processor also configured to present the most suitable directory to a user.

In exemplary embodiments in accordance with principles of inventive concepts the processor is configured to vector convert the target image.

In exemplary embodiments in accordance with principles of inventive concepts the processor is configured to vector convert an image representative of a directory.

In exemplary embodiments in accordance with principles of inventive concepts the content information includes processed information of the captured image.

In exemplary embodiments in accordance with principles of inventive concepts the environment information is extrinsic information acquired from the imager related to the target image.

BRIEF DESCRIPTION OF THE DRAWINGS

The above and other features and advantages of the present invention will become more apparent by describing in detail preferred embodiments thereof with reference to the attached drawings in which:

FIG. 4 is a diagram for explaining a classification model created in a second sub processor shown in FIG. 3;

FIG. 5 is a diagram for explaining an image converted into a vector form by a first sub processor shown in FIG. 3;

FIG. 6 is a diagram for explaining an example of the image converted into a vector form shown in FIG. 5;

FIG. 7 is a diagram for explaining a method for creating the classification model shown in FIG. 4;

FIG. 8 is a diagram for explaining a method for selecting a directory in which a target image is to be stored using the classification model shown in FIG. 4;

DETAILED DESCRIPTION OF THE EMBODIMENTS

Figure 1:
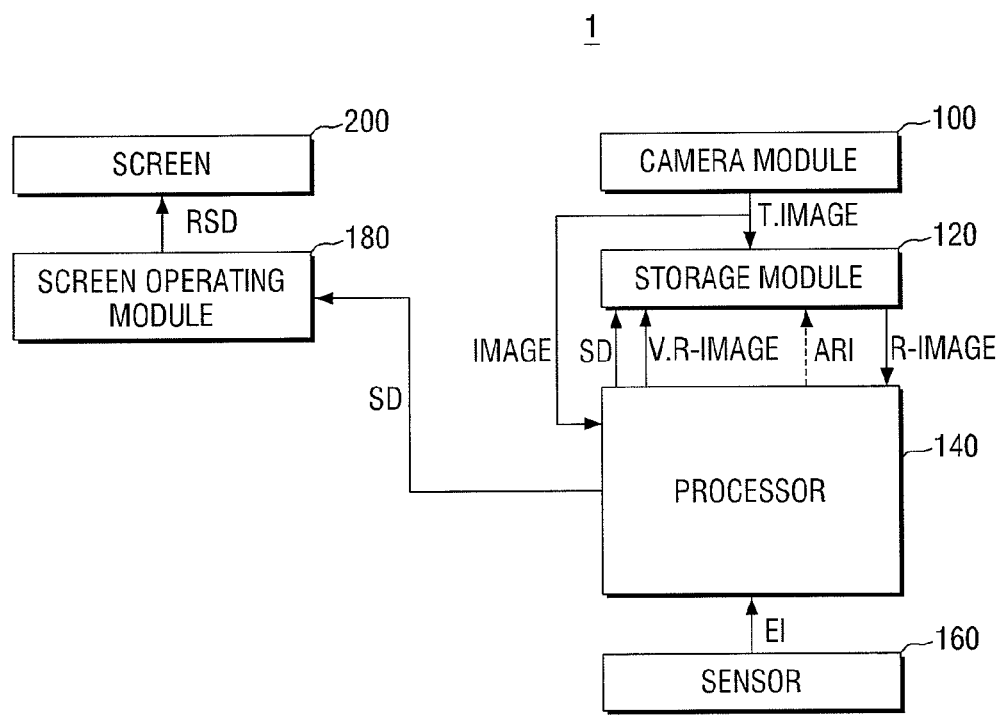
FIG. 1 is a block diagram of an image classification device in accordance with principles of inventive concepts.

Various exemplary embodiments will be described more fully hereinafter with reference to the accompanying drawings, in which some exemplary embodiments are shown. Inventive concepts may, however, be embodied in many different forms and should not be construed as limited to the exemplary embodiments set forth herein. Rather, these exemplary embodiments are provided so that this description will be thorough and complete, and will convey the scope of inventive concepts to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items and the term "or" is meant to be inclusive, unless otherwise indicated.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts. The thickness of layers may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of inventive concepts.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an exemplary embodiment of an image classification device according to principles of inventive concepts will be described with reference to FIGS. 1 to 3.

Figure 2:
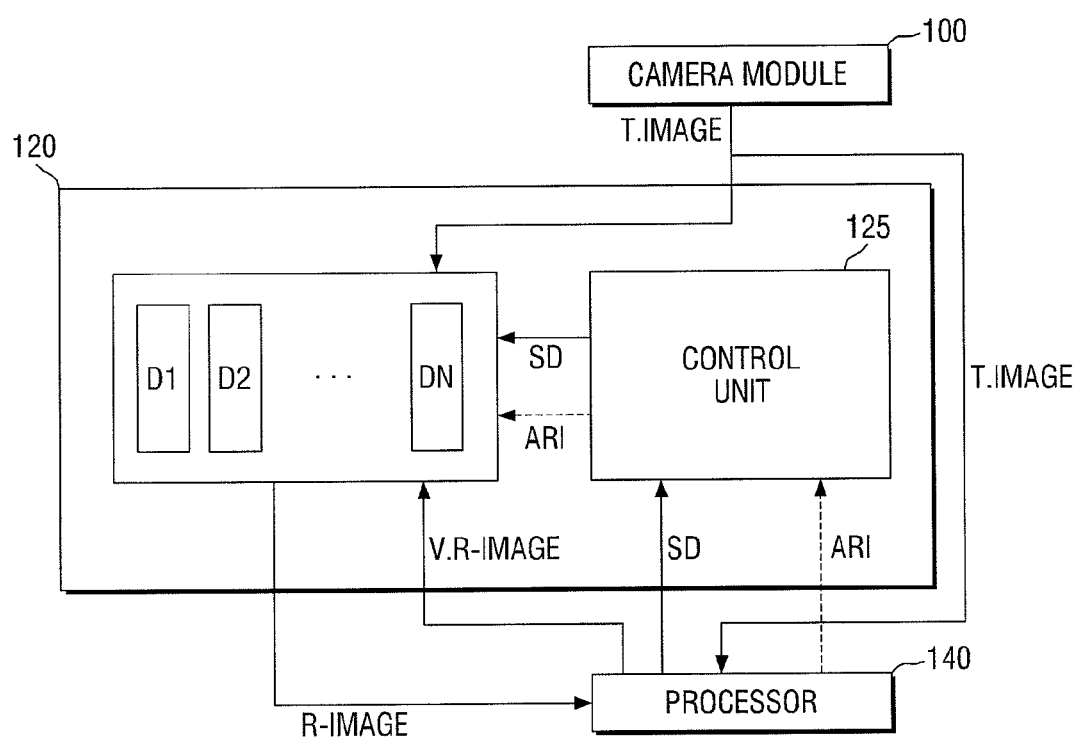
FIG. 2 is a block diagram of a storage module shown in FIG. 1.
Figure 3:
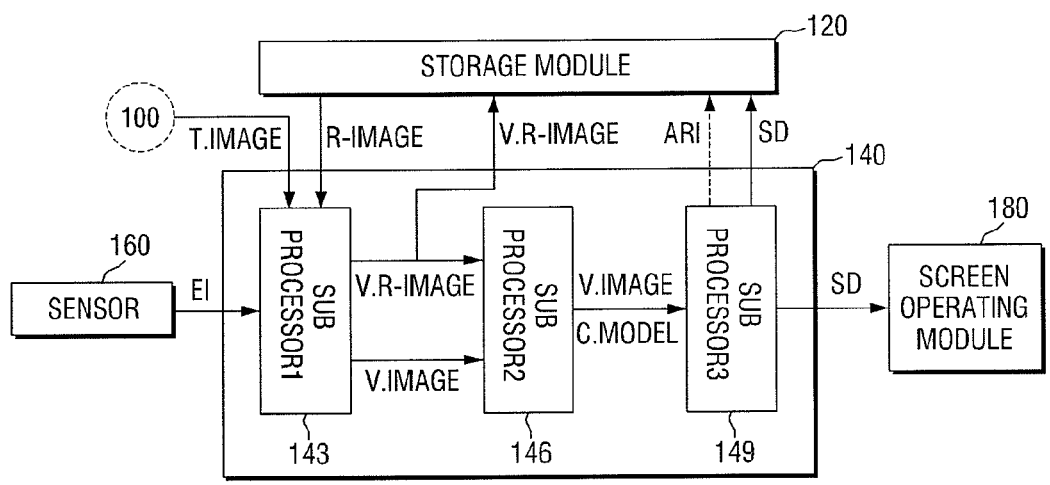
FIG. 3 is a block diagram of a processor shown in FIG. 1.

FIG. 1 is a block diagram of an image classification device in accordance with principles of inventive concepts, FIG. 2 is a block diagram of a storage module shown in FIG. 1, and FIG. 3 is a block diagram of a processor shown in FIG. 1.

Referring to FIG. 1, the image classification device 1 may include a camera module 100, a storage module 120, a processor 140, a sensor 160, a screen operating module 180, and a screen 200.

The camera module 100 may photograph a target and may create a target image T.IMAGE (that is, form an image of direct and/or reflected light from a target scene). In addition, the camera module 100 may provide the target image T.IMAGE to the storage module 120 and the processor 140. In operation, the camera module may convert areas of light intensity in the target scene, first to analog signals and then to digital signals representative of the light intensity, for example.

The storage module 120 may receive the target image T.IMAGE from the camera module 100 and may store the target image T.IMAGE.

Referring to FIG. 2, the storage module 120 may include N directories D1 to DN (where N is a natural number), and a control unit 125.

In exemplary embodiments in accordance with principles of inventive concepts, the target image T.IMAGE received from the camera module 100 may be stored in one of the N directories D1 to DN. In addition, representative images R-IMAGE representing the respective directories may be stored in the N directories D1 to DN, respectively. In addition, the representative images V.R-IMAGE may be converted into vector forms by the processor 140 to then be registered in the respective directories. The vector-converted representative images V.R-IMAGE will be described in greater detail in discussion related to upcoming figures.

In exemplary embodiments in accordance with principles of inventive concepts the N directories D1 to DN are represented by different representative images R-IMAGE, respectively, and may store images having different features. For example, a first directory D1 among the N directories D1 to DN may generally include a face and mainly stores a target image T.IMAGE meeting conditions, including a major area occupied by the face, an entirely dark image, being photographed in the daytime and not being limited in location (such as determined by GPS location). In addition, a second directory D2 does not include images having a face and mainly stores a target image T.IMAGE meeting conditions, including an entirely bright image, not being limited in a photographing time, and a localized area (such as determined by GPS location).

In exemplary embodiments in accordance with principles of inventive concepts, the N directories D1 to DN may be defined by the user, and images having different features, features relevant to one another and to a directory, may be stored in the respective directories.

In addition, when a classification model (to be described in greater detail below) is created, the processor 140 may use the representative images R-IMAGE respectively stored in the N directories D1 to DN for classification, as will be described in greater detail below.

The control unit 125 may receive information concerning the selected directory in which the target image T.IMAGE is to be stored (to be briefly referred to as 'selected directory information SD', hereinafter) and information concerning newly registered representative images (to be briefly referred to as 'added representative image information ARI' hereinafter and described in greater detail below) from the processor 140. In addition, the control unit 125 may provide the selected directory information SD and the added representative image information ARI to the N directories D1 to DN.

Additionally, if the user determines a directory disclosed in the selected directory information as a directory in which the target image T.IMAGE is to be stored, the target image T.IMAGE may be stored in the selected directory among the N directories D1 to DN. However, if the user does not determine a directory disclosed in the selected directory information as a directory among the N directories D1 to DN, in which the target image T.IMAGE is to be stored, the target image T.IMAGE may not be stored in the selected directory.

That is to say, in a state in which the target image T.IMAGE and the selected directory information SD are provided to the N directories D1 to DN, the target image T.IMAGE may be or may not be stored in the selected directory according to the user's determination.

Referring again to FIG. 1, the processor 140 may receive the target image T.IMAGE from the camera module 100 and may receive the environment information EI from the sensor 160. Processor 140 may provide the selected directory information SD and the added representative image information ARI to the storage module 120.

In exemplary embodiments, referring to FIG. 3, the processor 140 may include a first sub-processor (SUB PROCESSOR 1) 143 to a third sub-processor (SUB PROCESSOR 3) 149.

The first sub processor 143 may receive the environment information EI from the sensor 160 and may receive the target image T.IMAGE from the camera module 100. The first sub processor 143 may extract content information from the target image T.IMAGE and may convert the extracted target image T.IMAGE into a vector-form image including the content information and the environment information EI. The vector-converted target image V.IMAGE may be provided to the second sub processor 146.

In exemplary embodiments in accordance with principles of inventive concepts, the content information may include, for example, information acquired from the target image T.IMAGE itself and may include processed information of the image (for example, scaling, rotation, partitioning extent of a face or an object, etc.) or non-processed information (for example, a non-processed image itself), for example.

In exemplary embodiments in accordance with principles of inventive concepts, content information may include features extracted from the processed or non-processed information of the image (for example, features extracted from algorithm, such as SIFT, SURF, FAST, etc.) or descriptors constructed from the features (for example, descriptor vectors created from algorithm, such as SIFT, SURF, FAST, etc.).

Environment information EI may include extrinsic factors associated with the target image T.IMAGE. For example, the environment information EI may include various kinds of information that can be acquired from an image photographing apparatus, including, for example, luminous intensity, a photographing time, information concerning different images in ON and OFF periods of a camera application based on the image photographing time, GPS information related to photographing positions/locations, and user's activities associated with a corresponding image (for example, SNS uploading, etc.).

In exemplary embodiments in accordance with principles of inventive concepts, in creating the classification model C.MODEL, the first sub processor 143 may use the representative images R-IMAGE stored in the respective N directories D1 to DN of the storage module 120. For example, the first sub processor 143 may convert the representative images R-IMAGE stored in the respective N directories D1 to DN into vector forms.

In exemplary embodiments in accordance with principles of inventive concepts, the vector-converted representative images V.R-IMAGE may include content information extracted from the representative images R-IMAGE and environment information associated with the representative images R-IMAGE. The content information extracted from the representative images R-IMAGE may include features extracted from the processed or non-processed representative images R-IMAGE and descriptors constructed from the features. In addition, the environment information EI associated with the representative images R-IMAGE, which is received from the sensor 160, may include extrinsic factors associated with the representative images R-IMAGE.

The first sub processor 143 may provide the vector-converted representative images V.R-IMAGE to the second sub processor 146. That is, the first sub processor 143 may convert the target image T.IMAGE and the representative images R-IMAGE into vector forms, respectively, and then provide the converted images to the second sub processor 146. The first sub processor 143 may also provide the vector-converted representative images V.R-IMAGE to the storage module 120 to register the provided images in the respective directories.

The second sub processor 146 may create the classification model C.MODEL based on the vector-converted representative images R-IMAGE and the N directories. In addition, the second sub processor 146 may receive the vector-converted target image V.IMAGE and the vector-converted representative images V.R-IMAGE from the first sub processor 143.

An exemplary embodiment of the classification model C.MODEL in accordance with principles of inventive concepts will now be described in more detail with reference to FIGS. 4 to 7.

Figure 5:
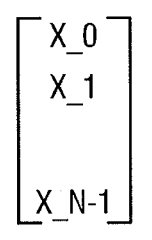

FIG. 4 is a diagram for explaining a classification model created in a second sub processor shown in FIG. 3, FIG. 5 is a diagram for explaining an image converted into a vector form by a first sub processor shown in FIG. 3, FIG. 6 is a diagram for explaining an example of an image converted into a vector form shown in FIG. 5, and FIG. 7 is a diagram for explaining a method for creating the classification model shown in FIG. 4.

Referring to FIG. 4, a classification model employing an M*N matrix is described (M N-dimensional classifiers), where M and N are natural numbers.

In exemplary embodiments in accordance with principles of inventive concepts, M rows may refer to M directories and N columns may refer to N weights in each directory.

In an exemplary embodiment in which the vector-converted target image V.IMAGE or the vector-converted representative images V.R-IMAGE include N elements (including content information and environment information), different weights may be assigned to the respective elements in each directory. In accordance with principles of inventive concepts, because the weights assigned to the respective elements in each directory are different from each other, images having different features may be classified and stored.

The classification model (M N-dimensional classifiers) shown in FIG. 4 is illustrated only by way of example, and may be implemented in a different form, other than the matrix form, for example.

Referring to FIG. 5, a vector-form image including an N*1 matrix, where N is a natural number, is illustrated. In exemplary embodiments in accordance with principles of inventive concepts, the vector-form image including an N*1 matrix (where, N is a natural number) may include the vector-converted target image or the vector-converted representative images. In addition, the respective elements forming N rows may include environment information associated with each image or content information extracted from each image. The N*1 matrix shown in FIG. 5, including a single column, may represent one image, for example.

Referring to FIG. 6, an example of the vector-form image embodied as the N*1 matrix shown in FIG. 5 is illustrated.

As described above, each of the vector-converted target image or the vector-converted representative images may include environment information and content information, and the respective elements forming the N rows may include information including physical information, for example, number of faces, whether a major face exists, light, day or night at the time of photographing, GPS information, and so on.

Referring to FIG. 7, a process for creating a classification model(M N-dimensional classifiers), the classification model created based on a vector-converted representative image matrix (K training inputs) and a matrix representing results of matching with M directories(K training results) are illustrated.

In this exemplary embodiment, the vector-converted representative image matrix (K training inputs) may include K vector-converted representative images represented by an N*K matrix including K representative images each having N elements.

The matrix representing results of matching with M directories (K training results) may represent results of K representative images for the respective M directories.

In terms of a single domain classifier, only the result directory located at 1*1 has a value of 1 and the remaining result directories 1*2 to 1*M all have a value of 0.

That is to say, only the calculation result of a single domain classifier in the classification model (M N-dimensional classifiers) and a single input vector in the vector-converted representative image matrix (K training inputs) is 1, and calculation results of $2^{nd}$ to Mth domain classifiers in the classification model and a single input vector in the vector-converted representative image matrix are all 0. This means that representative images corresponding to the single input vector in the vector-converted representative image matrix are representative images of a first result directory among M directories.

In this way, the classification model (M N-dimensional classifiers) can be created using the vector-converted representative image matrix (K training inputs) and the matrix representing results of matching with M directories (K training results).

Referring again to FIG. 3, the second sub processor 146 may create the classification model C.MODEL and may provide the vector-converted target image V.IMAGE and the classification model C.MODEL to the third sub-processor 149.

The third sub-processor 149 may select a directory in which the target image T.IMAGE is to be stored, among the N directories D1 to DN, using the vector-converted target image V.IMAGE and the classification model C.MODEL.

In this exemplary embodiment, the third sub-processor 149 may receive the vector-converted target image V.IMAGE and the classification model C.MODEL from the second sub processor 146. In addition, the third sub-processor 149 may select the directory in which the target image T.IMAGE is to be stored by performing a matrix operation of the received classification model C.MODEL and vector-converted target image V.IMAGE. A method for selecting a directory in which a target image is to be stored in accordance with principles of inventive concepts will be described with reference to FIG. 8, which is a diagram for explaining a method for selecting a directory in which a target image is to be stored using the classification model shown in FIG. 4.

In this exemplary embodiment, it is assumed that the classification model C.MODEL is represented by an M*N matrix and the vector-converted target image V.IMAGE is represented by an N*1 matrix.

Referring to FIG. 8, a matrix operation is performed on the single domain classifier in the classification model C.MODEL and the vector-converted target image V.IMAGE, and only the result directory located at 1*1 in the result of the matrix operation has a value of 1 and the remaining result directories 1*2 to 1*M all have a value of 0.

This means that the vector-converted target image V.IMAGE is suitably stored in the first directory among M directories. If the value of only the result directory located at 1*3 in the matrix is 1 and values of the remaining result directories 1*1 to 1*2 and 1*4 to 1*M are all 0, the vector-converted target image V.IMAGE is suitably stored in the third directory.

Although, in FIG. 8, the result of the matrix operation is a 0 or 1, the result of the matrix operation could be any of several values between 0 and 1. That is, if a matrix operation is performed on the single domain classifier in the classification model C.MODEL and the vector-converted target image V.IMAGE, suitability indexes of respective N directories concerning the target image can be obtained. In exemplary embodiments in accordance with principles of inventive concepts, each of the suitability indexes can take on a value of between 0 and 1.

Referring again to FIG. 3, the third sub-processor 149 may select the directory in which the target image T.IMAGE is to be stored and may provide the selected directory information SD to the storage module 120 and the screen operating module 180.

In exemplary embodiments in accordance with principles of inventive concepts, the third sub-processor 149 may calculate suitability indexes of the respective N directories and may select a directory having the highest suitability index for the target image T.IMAGE as the directory in which the target image is to be stored.

In addition, the third sub-processor 149 may provide information concerning the directory having the highest suitability index for the target image T.IMAGE, that is, the selected directory information SD, to the screen operating module 180.

In exemplary embodiments in accordance with principles of inventive concepts, when not greater than a predetermined number of directories among the N directories D1 to DN have suitability indexes exceeding a predetermined suitability index for the target image T.IMAGE, the third sub-processor 149 may additionally register the target image T.IMAGE as a representative image of the directory in which the target image T.IMAGE is to be stored.

For example, if it is assumed that not greater than 2 among 10 directories have suitability indexes of 3 or greater, the target image has a suitability index with respect to only a few among 10 directories. That is to say, the target image may have a high suitability index with respect to only a directory having the highest suitability index and may also have a high probability of serving as a representative image for the directory. Therefore, the third sub-processor 149 determines that the target image T.IMAGE will also be registered as a representative image and may provide added representative image information ARI to the storage module 120, that is, the control unit 125.

In exemplary embodiments in accordance with principles of inventive concepts, the added representative image information ARI may include information concerning the target image to be registered as a representative image.

Through the above-described procedure, one or more representative images may be stored in each of the N directories. As the number of representative images increases, the possibility of the target image being classified and recommended as a suitable directory may be increased.

That is to say, referring to FIG. 2, for example, the control unit 125 may provide the added representative image information ARI received from the processor 140, specifically, the third processor (149 of FIG. 3), to the N directories D1 to DN. In addition, the N directories D1 to DN provided with the added representative image information ARI may add the target image corresponding to the directory as a representative image.

Referring again to FIG. 1, the sensor 160 may sense environment information EI associated with an image (a target image or a representative images R-IMAGE).

In this exemplary embodiment, the sensor 160 may sense the environment information EI associated with the image and may provide the sensed environment information EI to the processor 140. That is, the sensor 160 may provide the environment information EI to the first sub processor (143 of FIG. 3).

The screen operating module 180 may receive the selected directory information SD from the processor 140.

In this exemplary embodiment, the screen operating module 180 may receive the selected directory information SD from the third sub-processor (149 of FIG. 3) and may provide message-implemented elected directory information RSD to the screen 200.

For example, when a first directory is selected as the directory in which the target image is to be stored, the message-implemented elected directory information RSD may include text messages, including 'Store photo in first directory?, YES or NO,' which may be used to allow a user to approve of such storage.

The screen 200 may receive the message-implemented elected directory information RSD from the screen operating module 180 and may display the same.

In exemplary embodiments in accordance with principles of inventive concepts image classification device 1 includes the processor 140 creating the classification model C.MODEL based on the N directories D1 to DN defined by the user and the representative images R-IMAGE representing the respective directories. In such exemplary embodiments, processor 140 may determine in real time which directory among the N directories D1 to DN is suitable for storage of a newly photographed and generated target image T.IMAGE and may recommend the suitable directory to the user.

Hereinafter, an electronic system including the image classification device illustrated in FIG. 1 will be described with reference to FIGS. 9 to 11.

Figure 9:
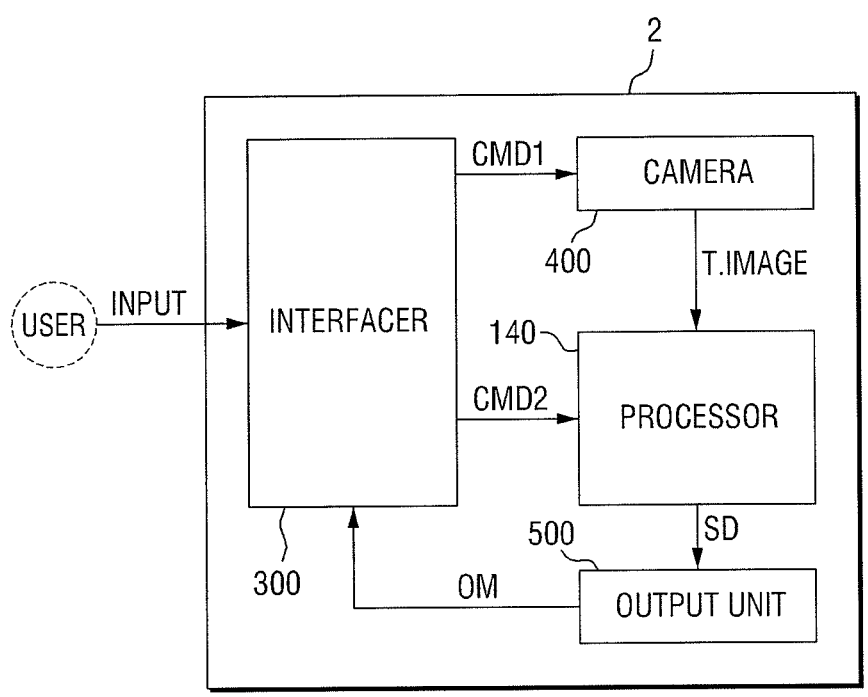
FIG. 9 is a block diagram illustrating an electronic system including the image classification device shown in FIG. 1.
Figure 10:
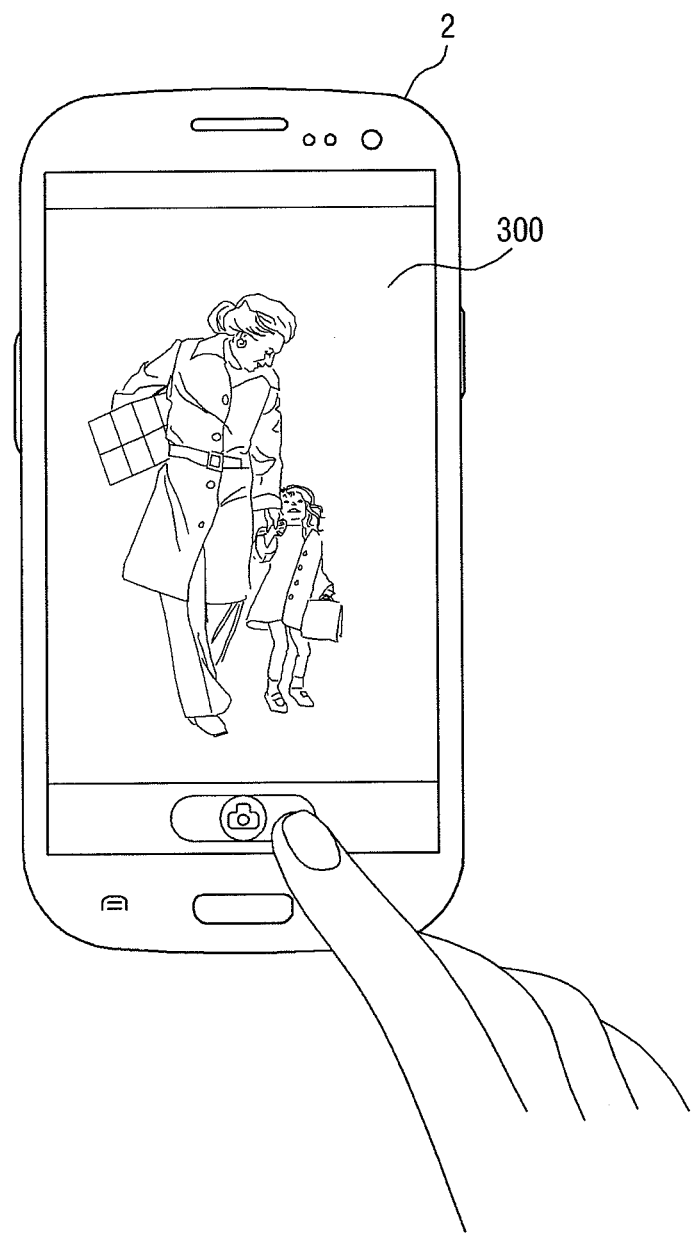
FIGS. 10 and 11 are conceptual diagram for explaining the electronic system shown in FIG. 9.
Figure 11:
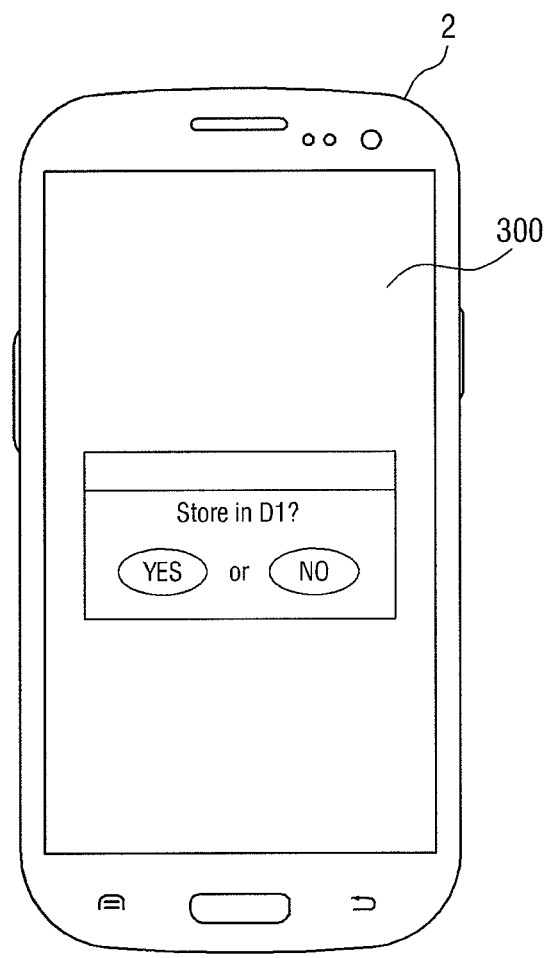

FIG. 9 is a block diagram illustrating an electronic system including the image classification device shown in FIG. 1, and FIGS. 10 and 11 are conceptual diagrams which will be used to explain in greater detail the electronic system shown in FIG. 9.

Although inventive concepts will be described in the context of a smart phone exemplary embodiment, electronic system 2 may be implemented in any of a variety of ways, including a tablet, phablet, or a notebook computer, for example.

Referring to FIG. 9, the electronic system 2 may include an interfacer 300, a camera 400, a processor 140, an output unit 500, and an image classification device in accordance with principles of inventive concepts, such as image classification device 1 shown in FIG. 1.

In exemplary embodiments, the interfacer 300 may receive an input from a user, for example, for registering representative image in respective N directories in which an image is stored. Such input may be touch input from the user, for example, and may provide first and second commands CMD1 and CMD2 to the camera 400 and the processor 140.

In exemplary embodiments in accordance with principles of inventive concepts, the first command CMD1 may include a photographing command to photograph a target and the second command CMD2 may include a command to create a classification model based on N directories and representative images registered in the N directories.

In exemplary embodiments in accordance with principles of inventive concepts, when the input entered by the user through the interfacer 300 is an input of a photograph button displayed on the interfacer 300, the first command CMD1 may be provided to the camera 400 and when the input entered by the user through the interfacer 300 is an input for storage of the representative images in the N directories, the second command CMD2 may be provided to the processor 140.

In addition, the interfacer 300 may receive a directory recommendation message OM from the output unit 500 and may display the same, as will be described in greater detail below.

The camera 400 may receive the first command CMD1 from the interfacer 300 and may photograph a target in response and may provide the generated target image to the processor 140.

The processor 140 may receive the second command CMD2 from the interfacer 300, may create a classification model and may select a directory in which the target image is to be stored, among N directories, using the classification model.

In addition, the processor 140 selects the directory in which the target image is to be stored, from among N directories, to generate selected directory information SD. The processor 140 may provide the generated selected directory information SD to the output unit 500.

In exemplary embodiments in accordance with principles of inventive concepts, the processor 140 may perform the same function with the processor shown in FIG. 1, for example.

The output unit 500 may receive the selected directory information SD and may process the same in the form of a message.

In this exemplary embodiment, the output unit 500 may process the selected directory information SD and may generate the directory recommendation message OM. In addition, the output unit 500 may provide the directory recommendation message OM to the interfacer 300. In exemplary embodiments in accordance with principles of inventive concepts, when the directory in which the target image is to be stored is a first directory among the N directories, the directory recommendation message OM may be, for example, a message 'Store in first directory? YES or NO'.

Referring to FIGS. 10 and 11, the operation of the electronic system 2 shown in FIG. 9 is described in the context of a smart phone exemplary embodiment.

First, referring to FIG. 10, an object to be photographed, that is, a target, may be displayed on the interfacer 300 (for example, the display panel) through a camera (not shown). Then, if the user provides input, such as a touch input, for a camera button to the interfacer 300, the processor 140 may select the directory in which the target image is to be stored according to the operations of the above-described components shown in FIG. 9.

Next, referring to FIG. 11, the processor 140 may provide the information concerning the selected directory (that is, selected directory information SD) to the user through the interfacer 300 in the form of a message. As shown in the exemplary embodiment of FIG. 11, a message 'Store in D1 (The first directory is denoted by D1.)? YES or NO' may be displayed through the interfacer 300. As described above, the electronic system 2 including the image classification device 1 according to the embodiment of the present invention may determine in real time in which directory among directories defined by the user a newly taken photograph is to be suitably stored and may recommend the suitable directory to the user for confirmation.

Additionally, when the user provides the input 'YES' to the interfacer 300 in response to the directory recommendation message OM, the interfacer 300 may provide feedback to the processor 140, and the processor 140 may add a target image T.IMAGE as a new representative image representing the selected directory.

Hereinafter, an exemplary embodiment of a method for operating an image classification device in accordance with principles of inventive concepts, such as that shown in FIG. 1, will be described with reference to FIGS. 12 to 15.

Figure 12:
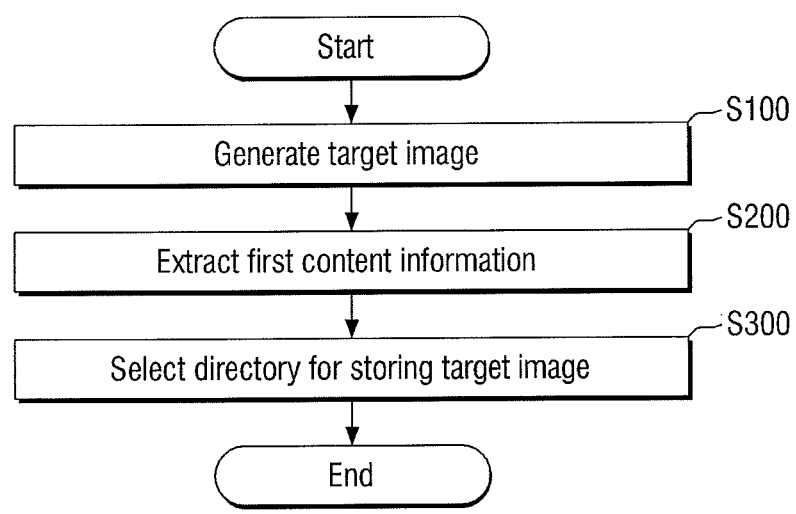
FIG. 12 is a flowchart for explaining a method for operating an image classification device in accordance with principles of inventive concepts.
Figure 13:
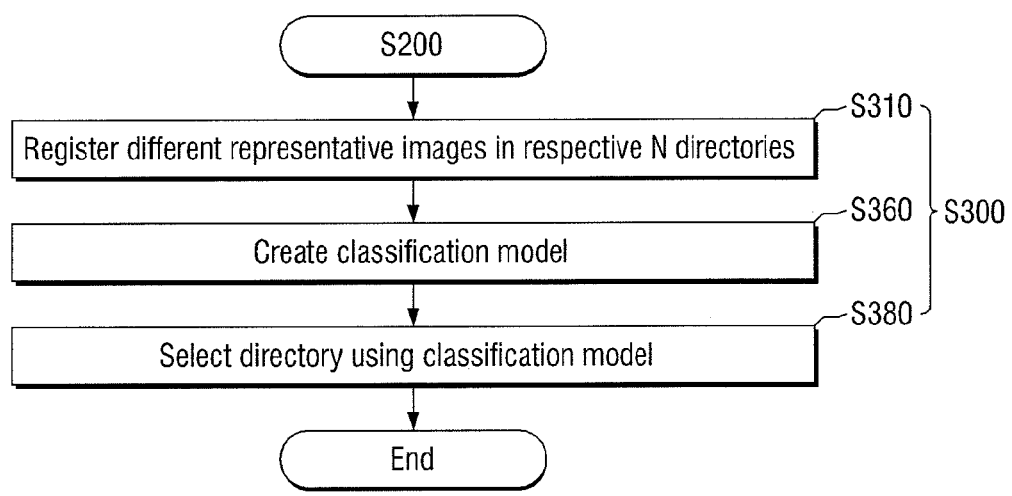
FIG. 13 is a flowchart for specifically explaining selecting a directory in which a target image shown in FIG. 12 is to be stored (S300)
Figure 14:
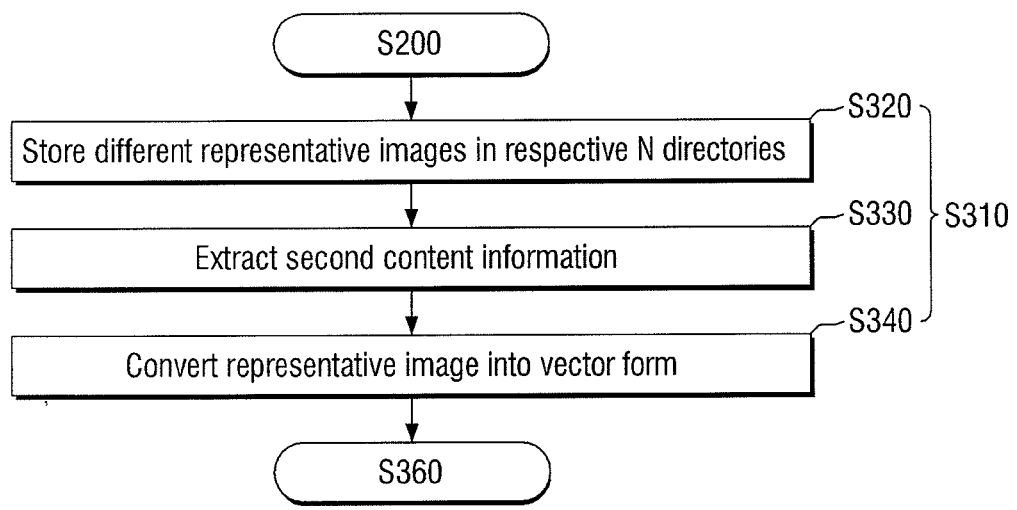
FIG. 14 is a flowchart for specifically explaining registering different representative images in N directories shown in FIGS. 13 (S310)
Figure 15:
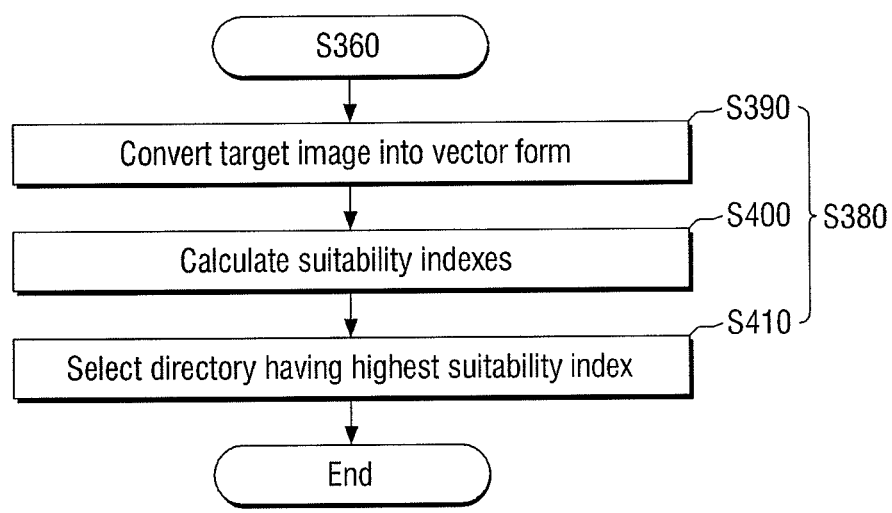
FIG. 15 is a flowchart for specifically explaining selecting a directory using the classification model shown in FIG. 13 (S380).

FIG. 12 is a flowchart for explaining a method for operating an image classification device in accordance with principles of inventive concepts, FIG. 13 is a flowchart for explaining in greater detail a process of selecting a directory in which a target image shown in FIG. 12 is to be stored (S300), FIG. 14 is a flowchart for explaining in greater detail a process of registering different representative images in N directories shown in FIG. 13 (S310), and FIG. 15 is a flowchart for explaining in greater detail a process of selecting a directory using the classification model shown in FIG. 13 (S380).

Referring to FIGS. 1 and 12, a target image is generated (S 100).

In this exemplary embodiment, a target is photographed using the camera module 100 to generate the target image T.IMAGE. In addition, the camera module 100 may provide the target image T.IMAGE to the storage module 120 and to the processor 140.

Next, first content information is extracted from the image (S200).

In this exemplary embodiment, the processor 140 may extract the first content information from the received target image T.IMAGE and may convert the target image into a vector form including first content information and first environment information. In exemplary embodiments in accordance with principles of inventive concepts, the first content information is extracted from the target image T.IMAGE and the first environment information is associated with the target image T.IMAGE.

Next, a directory in which the target image is to be stored is selected (S300), the process of which be described in more detail with reference to FIG. 13.

First, different representative images are registered in N directories, respectively (S310).

FIG. 14 is a more detailed flowchart of a method for registering different representative images in the N directories.

First, different representative images are stored in the N directories, respectively (S320).

In this exemplary embodiment, the N directories are defined by a user, and the user may select representative images representing features of the respective directories and may store the representative images in the respective directories.

Next, second content information is extracted (S330).

In this exemplary embodiment, the processor 140 may extract the second content information from the representative images R-IMAGE stored in the N directories and may convert the representative images R-IMAGE into vector-form images each including second content information and second environment information. In exemplary embodiments in accordance with principles of inventive concepts, the second content information may be extracted from the representative images R-IMAGE and the second environment information may be associated with the representative images R-IMAGE, for example.

Next, the representative images are converted into vector forms (S340).

In this exemplary embodiment, the processor 140 may convert the representative images into vector-form images each having second content information and second environment information. The representative images stored in the N directories are converted into vector forms, thereby registering the representative images in the respective directories.

Referring again to FIG. 13, a classification model may be created (S360).

In this exemplary embodiment, the classification model may be created based on the vector-converted representative images and the N directories. The classification model is created in the same manner as in FIG. 7, and a detailed description thereof will not be repeated here.

Next, a directory is selected using the classification model (S380).

In this exemplary embodiment, the directory in which the target image is to be stored is determined by performing a matrix operation of the classification model and the vector-converted target image.

The selecting of the directory using the classification model (S380) will now be described in more detail with reference to FIG. 15.

Referring to FIG. 15, the target image is first converted into a vector form (S390).

In this exemplary embodiment, the processor 140 may convert the target image into a vector-form image having first content information and first environment information, for example.

Next, suitability indexes are calculated (S400).

In this exemplary embodiment, suitability indexes of the N directories with respect to the target image may be calculated by performing a matrix operation of a classification model and the vector-converted target image. The suitability indexes are calculated in the same manner as in FIG. 8, and a detailed description thereof will not be repeated here.

Next, a directory having the highest suitability index is selected (S410).

In this exemplary embodiment, among N directories, the directory having the highest suitability index with respect to the target image may be selected as the directory in which the target image is to be stored.

Through the above-described procedure, information concerning the selected directory may be displayed on the screen 200 to be recommended to the user, and if the user decides to store the target image in the selected directory, the target image may be stored in the corresponding, recommended, directory.

While inventive concepts have been particularly shown and described with reference to exemplary embodiments thereof, it will be understood by those of ordinary skill in the art that various changes in form and details may be made therein without departing from the spirit and scope of inventive concepts as defined by the following claims. It is therefore desired that the present embodiments be considered in all respects as illustrative and not restrictive, reference being made to the appended claims rather than the foregoing description to indicate the scope of the invention.

What is claimed is:

1. An image classification device comprising:
   a camera module that photographs a target and generating a target image;
   a sensor that senses first environment information concerning the target image;
   a storage module including N directories that store the target image, where N is a natural number; and
   a processor that extracts first content information from the target image and selecting from among the N directories a directory in which the target image is to be stored, based on the first content information and the first environment information, wherein the target image is a vector-converted image including N content and environment elements and wherein the N directories are defined by a user and different representative images are registered in the respective N directories.

2. The image classification device of claim 1, wherein the first environment information includes information acquired according to extrinsic factors of the target image.

3. The image classification device of claim 1, wherein the first content information includes information acquired from the target image itself.

4. The image classification device of claim 1, wherein the first content information includes information concerning whether to enlarge, reduce, or rotate the target image or not.

5. The image classification device of claim 1, wherein the N directories are defined by a user and the identity of a directory from among the N directories, in which the target image is recommended to be stored is provided to the user.

6. The image classification device of claim 1, wherein the processor comprises: a first sub-processor that converts the different representative images stored in the respective N directories into vector forms; and a second sub-processor that creates a classification model based on the vector-converted representative images and the N directories.

7. The image classification device of claim 6, wherein the first sub-processor converts the target image into a vector form, including the first content information and the first environment information.

8. The image classification device of claim 7, wherein the processor further comprises a third sub-processor that selects a directory among the N directories, in which the target image is to be stored using the classification model and the vector-converted target image.

9. The image classification device of claim 1, wherein the processor creates a classification model that selects a directory from among the N directories, in which the target image is to be stored, and the classification model is used in calculating suitability indexes of the N directories to the target image.

10. The image classification device of claim 1, wherein the processor directly receives the target image from the camera module.

11. An electronic system comprising:
an interfacer that receives inputs from a user to register representative images in respective N directories, where N is a natural number, under which images are stored;
a camera that receives a first command from the interfacer, for photographing a target based on the first command and for generating a target image;
a processor that receives a second command different from the first command from the interfacer, for creating a classification model using representative images associated with the N directories, and that selects from among the N directories a directory in which the target image is recommended to be stored, using the classification model and a vector-converted target image including N content and environment elements and wherein the N directories are defined by a user and different representative images are registered in the respective N directories; and
an output unit that processes information concerning the selected directory and for providing the processed information to the interfacer,
wherein the interfacer is configured to display the information concerning the selected directory received from the output unit.

12. The electronic system of claim 11, wherein the interfacer includes a display panel enabling a touch input.

13. The electronic system of claim 11, wherein the first command includes a command to photograph the target.

14. The electronic system of claim 13, wherein the second command includes a command to create the classification model based on the N directories and the representative images registered in the respective N directories.

15. A camera, comprising:
an imager that captures a target image;
a processor configured to store captured images in N different directories;
the processor also configured to extract content information and environment information related to a captured target image and to convert the target image to a vector image including the content and environment information and wherein the N directories are defined by a user and different representative images are registered in the respective N directories;
the processor also configured to determine from the content and environment information which of the different directories is most suitable for the captured image using a classification model trained using representative images including content and environment information; and
the processor also configured to present the most suitable directory to a user.

16. The camera of claim 15, wherein the processor is configured to vector convert the target image.

17. The camera of claim 15, wherein the processor is configured to vector convert an image representative of a directory.

18. The camera of claim 15, wherein the content information includes processed information of the captured image.

19. The camera of claim 15, wherein the environment information comprises extrinsic information acquired from the imager related to the target image.

* * * * *